(12) United States Patent
Benavides et al.

(10) Patent No.: US 10,184,026 B2
(45) Date of Patent: Jan. 22, 2019

(54) HYDROSILYLATION METHOD

(71) Applicant: Dow Global Technologies LLC, Midland, MI (US)

(72) Inventors: Rafael Benavides, Pearland, TX (US); David A. Babb, Lake Jackson, TX (US); Matthias Schaefer, Paderborn (DE); Patrick Fontanella, Lake Jackson, TX (US); William H. Heath, Lake Jackson, TX (US); Wenwen Li, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/533,355

(22) PCT Filed: Dec. 5, 2015

(86) PCT No.: PCT/US2015/064148
§ 371 (c)(1),
(2) Date: Jun. 5, 2017

(87) PCT Pub. No.: WO2016/105914
PCT Pub. Date: Jun. 30, 2016

(65) Prior Publication Data
US 2017/0362378 A1     Dec. 21, 2017

Related U.S. Application Data

(60) Provisional application No. 62/095,595, filed on Dec. 22, 2014.

(51) Int. Cl.
C08G 65/336 (2006.01)
C08G 18/10 (2006.01)
C08G 18/28 (2006.01)

(52) U.S. Cl.
CPC ........... *C08G 65/336* (2013.01); *C08G 18/10* (2013.01); *C08G 18/289* (2013.01); *C08G 2650/04* (2013.01); *C08G 2650/10* (2013.01); *C08G 2650/38* (2013.01); *C08G 2650/58* (2013.01)

(58) Field of Classification Search
None
See application file for complete search history.

(56) References Cited

U.S. PATENT DOCUMENTS 5,359,113 A    10/1994  Bank
2014/0100348 A1  4/2014  Vyakaranam

FOREIGN PATENT DOCUMENTS

WO   2011/150161 A   12/2011
WO   2012/003187 A   1/2012
WO   2012/003216 A   1/2012

*Primary Examiner* — Clinton A Brooks

(57) ABSTRACT

Vinyl-functional alcohols are silylated by reaction with a hydrolysable silyl hydride compound. The starting alcohol is heated and then combined with the silyl hydride and catalyst and allowed to heat exothermically. Cooling is applied when the conversion of vinyl groups is between 90-99%. In some embodiments, specified amounts of water are present. The cooling regimen and control of water content reduces certain side reactions, leading to greater yields to desired product.

20 Claims, No Drawings

HYDROSILYLATION METHOD

This invention relates to methods for forming organosilicone compounds by hydrosilylation of olefinic compounds.

Hydrosilylation is a method by which compounds having carbon-silicon bonds can be formed. In general, the method is carried out by reacting a silyl hydride compound with an olefin. The reaction is catalyzed. Platinum catalysts are most commonly used, but some rhodium and nickel compounds are also known to catalyze the reaction. See, e.g., U.S. Pat. Nos. 2,823,218, 3,220,972 and 5,359,113.

Recently, there has developed an interest in making polyether compounds that contain hydrolysable silane groups. A hydrosilylation reaction can be used to make these, with the starting materials being a polyether having both a hydroxyl group and an allyl group, and a (di)alkoxy (di)alkylsilane hydride. The hydrosilylated polyether so obtained can be coupled by, for example, reaction with a polyisocyanate and then a polyol, to form a polyether that contains multiple hydrolysable silane groups. That product is useful for making moisture-curable sealant and adhesive products. These products and methods for making them are described, for example, in WO 2011/150161, WO2012/003216, WO 2012/003187 and US 2014/0100348.

According to these references, the hydrosilylation reaction can be conducted at 0 to 150° C., with a temperature lower than 0° C. being disfavored because of a slow reaction rate and temperatures above 150° C. being disfavored due to the occurrence of side reactions. In the working examples of all of these except WO 2011/150161, the hydrosilylation is always performed at 60° C. In WO 2011/150161, various reaction temperatures between 25° C. and 80° C. are exemplified.

WO 2011/150161, WO2012/003216, WO 2012/003187 and US 2014/0100348 all report high conversions (sometimes expressed as "hydrosilylation efficiencies") of the starting materials. Conversion efficiency relates to the extent to which the raw materials (typically the allyl group of the starting polyether) are consumed in the reaction. However, a high conversion efficiency does not mean a high yield to desired product, which is a different matter altogether and which is more important as an economic matter. In fact, hydrosilylation reactions performed under the conditions described in the examples of these references are plagued by poor yields to the desired silyl-terminated polyether alcohol. Although one or both of the starting reactants are consumed in the reaction, side reactions convert much of the starting polyether away from the desired product. Although conversions are high, yields to product are disappointingly low.

Among the unwanted side products are high molecular weight materials, which are sometimes referred to as "heavies". These have molecular weights approximately double (or more) that of the intended product, and are believed to be formed in a coupling reaction in which silicone-containing species (either the starting silyl hydride or some reaction product thereof) react with the hydroxyl groups of two polyether molecules. This coupling reaction consumes the hydroxyl groups of the polyether, so the high molecular weight species are not reactive with isocyanate groups, and so cannot engage in subsequent reactions to produce the desired product. This affects the molecular weight distribution and functionality of the final product in disadvantageous ways. In addition, the high molecular weight materials usually do not participate in curing reactions.

Another problem with earlier processes is that the platinum catalyst is known to be sensitive to water, and for that reason the reaction has been conducted in the presence of very small water levels, typically 100 ppm or less based on the weight of the starting polyether. Since as commercial products the polyether raw material generally contains significantly more water than that, it has been necessary to dry the polyethers to reduce the water levels. Because the polyols are hygroscopic to varying degrees, drying is difficult, typically entailing heating under subatmospheric pressure for several hours. This adds significantly to the time and expense of producing the product.

Yet another problem with earlier processes is that very long reaction times sometimes are required to obtain high conversions. In some cases, high conversions are not obtained at all despite prolonged reaction times.

What is desired is a process for hydrosilylating unsaturated alcohols, especially unsaturated polyether polyols, to produce alkoxysilyl-terminated alcohols at fast reaction rates and high yields to the desired product. In particular, it is desired to provide a process in which at most only low levels of high molecular weight species are produced.

In a first aspect, the invention is a process for producing a silyl-terminated alcohol by reacting a vinyl-functional alcohol with a hydrolysable silyl hydride in the presence of a platinum catalyst, comprising the steps of:

a) heating the vinyl-functional alcohol to a temperature of 40 to 65° C., then b) adding the platinum catalyst and from 0.8 to 1.1 moles of the hydrolysable silyl hydride per mole of vinyl-functional alcohol to the heated vinyl-functional alcohol to form a reaction mixture; then c) reacting the reaction mixture under conditions such that at least part of the vinyl-functional alcohol and at least part of the hydrolysable silyl hydride react to form the silyl-terminated alcohol, wherein the temperature of the reaction mixture increases at least partially due to exothermic heat of reaction to above 75° C. but not greater than 100° C., and then d) upon conversion of 90 to 99% of the vinyl groups of the vinyl-functional alcohol, cooling the reaction mixture to a temperature of 65° C. or below, whereby after step d) the conversion of vinyl-functional alcohol is at least 90% and the amount of high molecular weight impurities is no greater than 10% of the combined weight of the starting amounts of vinyl-functional alcohol and hydrolysable silyl hydride.

This process provides the advantages of obtaining a fast reaction rate together with the formation of only small and tolerable amounts of high molecular weight impurities. Unlike previous processes, strict control over the reaction exotherm is not necessary during initial stages of the reaction. This is a very significant advantage, particularly at large scale (as in industrial production equipment) in which the measures needed to exert close control over the reaction exotherm are difficult and expensive to the point of being impractical. In this process, the temperature is permitted to rise due to the exothermic heat of reaction to as high as 100° C., which facilitates fast reaction rates and short cycle times. Cooling is applied at 90 to 99% conversion, which further shortens the cycle time and is believed to favor the production of low amounts of impurities.

In a second aspect, the invention is a process for producing a silyl-terminated alcohol by reacting a vinyl-functional alcohol with a hydrolysable silyl hydride in the presence of a platinum catalyst, comprising the steps of:

a) forming a heated mixture of a vinyl-functional alcohol and 150 to 2000 ppm water based on the weight of the vinyl-functional alcohol, which heated mixture has a temperature of 40 to 80° C., then b) adding the platinum catalyst and from 0.8 to 1.1 mole of the hydrolysable silyl hydride per mole of vinyl-functional alcohol to the heated mixture to form a reaction mixture; and then c) reacting the reaction mixture under conditions including a temperature of 70 to 100° C. such that at least part of the vinyl-functional alcohol and at least part of the hydrolysable silyl hydride react to form the silyl-terminated alcohol, wherein the conversion of vinyl-functional alcohol is at least 90% and the amount of high molecular weight impurities is no greater than 10% of the combined weight of the starting amounts of vinyl-functional alcohol and hydrolysable silyl hydride.

Surprisingly, the presence of 150 to 2000 ppm of water not only can be tolerated in the process, but also provides important benefits. Reaction rates are fast and cycle times are short despite the presence of the water. Moreover, the presence of water has been found to suppress the formation of high molecular weight impurities. This makes the process more tolerant of higher temperatures which are desired for obtaining fast reaction rates and short cycle times but which are also believed to contribute to the formation of high molecular weight impurities. Thus, the presence of the water has been found to lead to a fast process with high conversions and in which only small amounts of high molecular weight impurities are formed. Another advantage is that rigorous drying of the starting materials can be avoided, which leads to a further significant reduction in costs and cycle times.

The starting vinyl-functional alcohol is a compound having at least one vinyl (H$_2$C=CR—, where R is hydrogen, unsubstituted or inertly substituted alkyl, or aryl) group and at least one hydroxyl group. R is preferably hydrogen. An inert substituent is one which does not react under the conditions of the silyl-terminated alcohol-forming reaction(s). The starting vinyl-functional alcohol preferably has one or two, preferably one, vinyl groups. The vinyl group is preferably is an allyl group, i.e., a group having the form

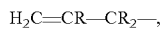

where each R is as defined above, and the R moieties all can be the same or different. In especially preferred cases, each R is hydrogen.

The starting vinyl-functional alcohol may have, for example, one to four, preferably one to two and still more preferably one hydroxyl group. The hydroxyl group(s) preferably are not bonded directly to a carbon atom of a vinyl group. Examples of vinyl-functional alcohols include vinyl alcohol, allyl alcohol, methallyl alcohol, trimethylolpropane monoallyl ether, trimethylolpropane diallyl ether, glycerol monoallyl ether, glycerol diallyl ether, hydroxyethyl acrylate, hydroxyethyl methacrylate, a hydroxyl-terminated polybutadiene, and the like.

In certain embodiments, the vinyl-functional alcohol is a vinyl functional polyether alcohol. The vinyl group of such a vinyl-functional polyether alcohol preferably is terminal, being at one end of a polyether chain rather than being pendant. As before, the vinyl group(s) preferably are allylic. The hydroxyl group(s) preferably are terminal rather than pendant, and are preferably aliphatic. The hydroxyl groups may be primary, secondary or tertiary, although primary and secondary hydroxyl groups are preferred.

The polyether chain may be a polymer of one or more oxirane compounds that contain no aliphatic carbon-carbon unsaturation. Examples of such oxiranes include ethylene oxide, 1,2-propylene oxide, 1,2-butylene oxide, 2,3-butylene oxide, tetrahydrofuran, 1,2-hexene oxide, 1,2-octene oxide and styrene oxide. If a copolymer, the copolymer may be a random and/or a block type. Preferably, the polyether chain is a polymer of 1,2-propylene oxide, a polymer of ethylene oxide, or a random or block copolymer of 70-99.5 weight-% 1,2-propylene oxide and correspondingly 0.5 to 30 weight-% ethylene oxide.

The vinyl-functional polyether alcohol may have a number average molecular weight of 500 to 10,000. In some embodiments its number average molecular weight is 500 to 6000, 600 to 3000 or 750 to 1500.

Such vinyl-functional polyether alcohols may correspond to the structure:

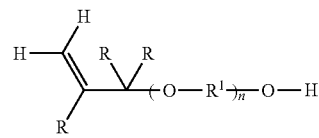

where each R is defined before, each R$^1$ is independently alkylene or inertly substituted alkylene, and n is at least 2. As before, each R preferably is hydrogen. R$^1$ is preferably ethylene (—CH$_2$—CH$_2$—), propylene (either —CH$_2$—CH(CH$_3$)— or —CH(CH$_3$)—CH$_2$—) or a mixture of ethylene and propylene. N preferably is such that the vinyl-functional polyether alcohol has a number average molecular weight of 500 to 10,000, preferably 500 to 6000, 600 to 3000 or 750 to 1500.

The vinyl-functional polyether is conveniently prepared by polymerizing the oxirane compound(s) in the presence of an alcoholic initiator having one or more hydroxyl groups and one or more sites of vinyl unsaturation. The alcoholic initiator may be, for example, any of the vinyl-functional alcohols mentioned above, with those having allyl groups being preferred. The polymerization can be performed in the presence of a polymerization catalyst such as an alkali metal hydroxide (especially potassium hydroxide) or a double metal cyanide catalyst complex such as a zinc hexacyanocobaltate catalyst complex.

The hydrolysable silyl hydride has at least one, and preferably exactly one, silicon-hydrogen bond, and at least one hydrolysable substituent bonded directly to a silicon atom. There may be, for example, 1 to 8, 1 to 6, 2 to 6 or 2 to 4 hydrolysable substituent(s). The hydrolysable substituent(s) may be, for example, halogen (such as chlorine), alkoxy, acyloxy, ketoximato, amino, amido, acid amide, aminoxy, mercapto or alkenyloxy. Alkoxy substituent(s) are preferred among these. Suitable hydrolysable silyl hydride compounds include the compounds described in paragraphs [0025]-[0028] of WO 2012/003216. Specific hydrolysable silyl hydride compounds include trichlorosilane, methyl dichlorosilane, dimethylchlorosilane, phenyldichlorosilane, trimethylsiloxymethylchlorosilane, 1,1,3,3-tetramethyl-1-bromodisiloxane, trimethoxysilane, triethoxysilane, methyldiethoxysilane, methyldimethoxysilane, phenyldimethoxysilane, trimethylsiloxymethylmethoxysilane, trimethylsiloxydiethoxysilane, methyldiacetoxylsilane, phenyldiacetoxysilane, triacetoxy silane, trimethylsiloxymethylacetoxysilane, trimethylsiloxydiacetoxysilane, bis(dimethyl ketoximato)methylsilane, bis(cyclohexyl ketoximato) methylsilane, bis(diethyl ketoximato)trimethylsiloxysilane, bis (methyl ethyl ketoximato)methylsilane, tris(acetoxamato)silane and methylisopropenyloxysilane. Among these, methyldimethoxysilane, trimethoxysilane, methyldiethoxysilane, triethoxysilane, trichlorosilane and methyldichlorosilane are preferred on the basis of favorable reactivity and ease of handling.

The platinum catalyst may be, for example, $H_2PtCl_6.6H_2O$, a platinum-divinylsiloxane complex, a platinum-olefin complex, metallic platinum, and the like. In some embodiments, the platinum is provided in the zero valence state, or may be converted to the zero valence state during the process. The platinum-divinylsiloxane complex is a compound resulting from coordination of a vinyl-containing siloxane, polysiloxane or cyclic siloxane, as a ligand, to a platinum atom. The ligand may be, for example, 1,1,3,3-tetramethyl-1,3-divinylsiloxane. The platinum-olefin complex is a compound resulting from the coordination of an olefin, as a ligand, to a platinum atom. Examples of olefin ligands are 1,5-hexadiene, 1,7-octadiene, 1,9-decadiene, 1,11-dodecadiene and 1,5-cyclooctadiene. A platinum catalyst of particular interest is Karstedt's catalyst, which is a platinum divinyltetramethylsiloxane compound, typically supplied in a solvent or other liquid carrier.

The First Aspect of the Invention

In the process of the first aspect, the vinyl-functional alcohol is heated to a temperature of 40 to 65° C. (step a)).

In step b) of the process of the first aspect, the platinum catalyst and from 0.8 to 1.1 moles of the hydrolysable silyl hydride per mole of vinyl-functional alcohol are added to the heated vinyl-functional polyether to form a reaction mixture. A preferred amount is up to 1.02 moles and a more preferred amount is up to 1.0 mole, per mole of vinyl-functional alcohol. It is preferred to avoid an excess of the hydrolysable silyl hydride due to the cost of the reagent and the possibility of unwanted side-reactions.

When the vinyl-functional alcohol contains allyl unsaturation, a portion of the allyl unsaturation typically isomerizes to a propenyl ($CH_3$—CH=CR—) group under the reaction conditions. Typically, 10 to 25, especially 10 to 18%, of the allyl unsaturation has been found to isomerize. The internal unsaturation of the propenyl group is far less reactive towards the silyl hydride than allyl or vinyl unsaturation, and for the most part will pass through the process without reacting further. In such cases, the amount of hydrolysable silyl hydride provided to the process is generally reduced to account for the expected amount of isomerization. When the starting alcohol contains allyl unsaturation, therefore, a preferred amount is 0.75 to 0.9 mole of the silyl hydride per mole of starting alcohol and a more preferred amount is 0.82 to 0.9 moles of the silyl hydride per mole of starting alcohol. This brings the molar amount of the silyl hydride close to stoichiometry in relation to the portion of the vinyl-functional alcohol which is expected to react with the silyl hydride.

A catalytic amount of the platinum catalyst is provided to the reaction. Commercially suitable reaction rates often are obtained when enough of the catalyst is present to provide at least 10 parts by weight of platinum per million parts by weight of the starting vinyl-functional alcohol. The catalyst may provide at least 50 or at least 100 parts per million platinum on the same basis, and may provide up to 5000, up to 2000, up to 1000, up to 500 or up to 250 parts per million platinum on the same basis.

The reaction mixture may contain only the three ingredients (vinyl-functional alcohol, silyl hydride and catalyst) enumerated above, or may optionally contain one or more additional ingredients. The reaction mixture may include a solvent. The solvent, if present, may be a hydrocarbon such as, for example, hexane, cyclohexane, heptane, octane, decane, dodecane, benzene, toluene, xylene or dodecylbenzene. The solvent may be a halogenated compound such as chloroform, methylene chloride, chlorobenzene and o-dichlorobenzene or an ether compound such as diethyl ether, tetrahydrofuran, ethylene glycol dimethyl ether, and the like. Mixtures of any two or more of the foregoing solvents can be used. The solvent should not be reactive with the starting materials under the conditions of the process.

If water is present in the process of the first aspect, it preferably is present in an amount of no more than 1000 parts per million, and more preferably no more than 500 or no more than 200 parts per million, based on the weight of the vinyl-terminated alcohol. Any of the starting materials, in particular the vinyl-terminated alcohol, may be dried to remove water if necessary, before performing the process. The process preferably is performed under conditions that exclude additional water from the reaction vessel including, for example, performing it in a closed container under a substantially anhydrous atmosphere.

In step c) of the process of the first aspect, the vinyl-functional alcohol and hydrolysable silyl hydride react to form a silyl-terminated alcohol. The reaction generally will commence spontaneously upon mixing of the starting materials and catalyst. The reaction is conducted under conditions such that the temperature of the reaction mixture increases to above 75° C. but not greater than 100° C. In specific embodiments, the temperature increase to 75° C. to 95° C., to 75° C. to 90° C. or to 80° C. to 90° C. The reaction is exothermic and therefore the exothermic heat of reaction will produce an increase in the temperature of the reaction mixture.

In some cases, the exothermic heat of reaction is by itself sufficient to produce the aforementioned increase in temperature. In such cases, it is unnecessary and even undesirable to apply further heating to the reaction mixture and it may even be necessary to provide cooling to prevent the reaction mixture from overheating.

If the exothermic heat of reaction is by itself insufficient to achieve the necessary temperature increase, further heating may be provided. The exothermic heat of reaction may be by itself insufficient to achieve the temperature increase in specific embodiments due to various factors, including the selection of particular starting materials, some of which may react less exothermically than others; the amount and type of catalyst; the rate of addition of the hydrolysable silyl hydride; mass effects, particularly the presence of a solvent that increases the mass of the reaction mixture and therefore reduces the extent of temperature increase per a given quantity of exothermic heat; and other heat sink effects such as the mass and heat capacity of the reaction mixture and that of the reaction vessel. As will be appreciated, these and other factors can be selected in combination, together with applied heating and/or cooling, to achieve the desired reaction temperature.

In preferred embodiments, the reaction mixture attains the aforementioned temperature within 20 minutes, preferably within 10 minutes and more preferably within 5 minutes from the start of step b).

To reduce or prevent localized overheating from occurring, particularly in batch processes in which large volumes of starting materials are mixed and reacted, it is preferred to agitate the reaction mixture during steps b) and c). Agitation can be performed in any suitable manner, such as by stirring, shaking, applying ultrasonic energy, passing the reaction mixture through a mixing device such as a static mixer, and the like.

During step c), the vinyl-functional alcohol and at least part of the hydrolysable silyl hydride react to form the alkoxysilyl-terminated alcohol. In the process of the first aspect, the reaction is permitted to proceed at the aforementioned temperature until the conversion of the vinyl groups of the vinyl-functional alcohol reaches 90 to 99%, before conducting step d). "Conversion" in the context of each aspect of this invention means the reaction of the vinyl groups, and includes, for example, reaction of the vinyl groups with the hydrolysable silyl hydride as well as other reactions that result in the disappearance of the vinyl groups, such as the isomerization of allyl types to propenyl groups described before. In specific embodiments, the conversion of vinyl groups is 90 to 98%, 92 to 98%, 95 to 98%, 92 to 97%, or 92 to 95%. Upon achieving such conversions, the reaction mixture is cooled to a temperature of 65° C. or lower.

Conversion can be followed analytically using proton NMR methods.

The cooling step d) preferably is performed as soon as possible after the conversion reaches the aforementioned ranges. The conversion typically does not proceed to 100%, but instead usually reaches a plateau within one or more of the aforementioned ranges, after which the conversion proceeds slowly, such as less than 3% per minute, less than 2% per minute, or less than 1% per minute (based on the amount of starting vinyl-functional alcohol). The cooling step d) preferably is begun when such a plateau in the conversion rate is exhibited. It is preferred to complete cooling step d) within 30 minutes, more preferably within 20 minutes, still more preferably within 10 minutes and even more preferably no more than 5 minutes after the vinyl conversion reaches 90%, but prior to the conversion exceeding 99%. As the cooling step is performed the conversion may proceed to greater than 90%, up to 99%, due to the continuing reaction, before the temperature of the reaction mixture is cooled to 65° C. Some further conversion may occur even after the reaction mixture has been cooled to these temperatures.

In step d), the temperature may be reduced to no greater than 50° C. and still more preferably no greater than 40° C. In some embodiments, these lower temperatures may be achieved within 30, 20, 10 or 5 minutes after the conversion reaches 90%. In some embodiments, the temperature of the reaction mixture may be reduced to the range of 40 to 64° C. in step d), and then held in that temperature range to allow further conversion of the vinyl-functional alcohol to product.

Cooling can be achieved in any suitable manner. The reaction mixture can be combined with a lower temperature material. The reaction mixture can be contacted with a cool surface. The cool surface may be, for example, a cooled container and/or cooling tubes that contain a cooled thermal fluid. If the reaction is performed in a jacketed vessel, a cooling fluid can be introduced into the jacket to cool the internal reactor surfaces and the reaction mixture.

The control of temperature during steps a)-d) has been found to achieve the benefit of fast reaction rates and correspondingly short cycle times, while producing only low and acceptable levels of high molecular weight impurities. In particular, the preheating of the vinyl-terminated alcohol in step a) and the selection of reaction temperatures in step c) are believed to lead to rapid conversion of starting materials. Cooling step d) is believed to be important in suppressing the formation of high molecular weight impurities. The weight of those high molecular weight species may be no more than 10%, preferably no more than 8%, and often no more than 6% of the combined weight of the starting amounts of vinyl-functional alcohol and hydrolysable silyl hydride. In previous processes, the mass of these impurities is often 15 to 20% or even more of the combined mass of the starting amounts of vinyl-functional alcohol and hydrolysable silyl hydride.

The mass or weight of the high molecular weight species is for purposes of this invention the mass or weight of all reaction products that have a Si—O—Si linkage and molecular weight at least twice that of the starting vinyl-terminated alcohol. The mass or weight of the high molecular weight species can be determined, for example, using gel permeation chromatography methods or other methods by which the reaction products can be separated on the basis of mass and their respective weights determined.

Following step d), the resulting product mixture can be purified as desirable or necessary by, for example, removing residual catalyst, removing high molecular weight impurities, removing unreacted starting materials, removing other reaction by-products, removing any solvent, and the like. It is common to leave the high molecular weight impurities in the product, as separation is difficult on an industrial scale and the smaller amounts thereof that are produced in this process are often tolerated well when the product is processed into downstream products, including moisture curable materials as described below.

The Second Aspect of the Invention

The process of the second aspect is conducted in the presence of 150 to 2000 ppm water based on the weight of the vinyl-functional alcohol. The presence of these amounts of water has surprisingly been found to suppress the formation of high molecular weight impurities while having little effect on reaction rates. Because of the suppressive effect on heavy impurities, the presence of water allows somewhat higher temperatures to be used during steps a) and b). In addition, the cooling step d) of the first aspect is unnecessary, although it remains preferred.

In the process of the second aspect, the vinyl-functional alcohol is heated to a temperature of 40° C. to as much as 80° C. (step a)). In step b), the platinum catalyst and from 0.8 to 1.0 mole of the hydrolysable silyl hydride per mole of vinyl-functional alcohol are added to the heated vinyl-functional polyether to form a reaction mixture, as described with respect to the first aspect. Preferred amounts in embodiments in which the vinyl group is allyl (to take into account the anticipated conversion of some of the allyl groups to unreactive propenyl groups) also are as described in the first aspect. The amount of catalyst is suitably as described with respect to the first aspect. The reaction mixture can contain only the water and the three other ingredients enumerated above, or may optionally contain one or more additional ingredients as described before.

The amount of water preferably is at least 200 parts per million, and may be at least 250 parts per million, at least 300 parts per million or at least 400 parts per million, based on the weight of the vinyl-terminated alcohol. The amount of water may be up to 1500 parts per million, up to 1000 parts per million, up to 800 parts per million, up to 600 parts per million, or up to 500 parts per million, on the same basis. As before, any of the starting materials, in particular the vinyl-terminated alcohol, may be dried if necessary to remove water to achieve these levels, before performing the process. The process preferably is performed under conditions that exclude the introduction of additional water including, for example, performing it in a closed container under a substantially anhydrous atmosphere.

Step c) is generally performed in the same way as described for the corresponding step of the process of the first aspect, although somewhat higher temperatures, such as up to 150° C., up to 125° C., or up to 110° C., can be tolerated with good results. In specific embodiments, the temperature increases to 75° C. to 95° C., to 75° C. to 90° C. or to 80° C. to 90° C. The reaction is exothermic and therefore the exothermic heat of reaction will produce an increase in the temperature of the reaction mixture. Control of the temperature in this step can be achieved using the same methods as described before. As before, in preferred embodiments, the reaction mixture attains the aforementioned temperature within 20 minutes, preferably within 10 minutes and more preferably within 5 minutes from the start of step b). Also as before, agitation can be used during steps b) and c) to reduce or prevent localized overheating. Step c) is performed until conversions are obtained as described with respect to the first aspect.

Because heavies formation is suppressed in the process of the second aspect, the process is more tolerant of the temperatures encountered in step c), and the reaction mixture therefore can be held at those temperatures for a greater period without producing large amounts of heavies. According, the cooling step d) as described in the first aspect can be delayed or even omitted if desired. Therefore, in some embodiments, the reaction mixture is maintained at the step c) temperatures until no further conversion of the vinyl-terminated polyether alcohol is seen. In some embodiments, the reaction mixture is cooled to below 65° C. within 10 hours, within 5 hours, within 2 hours, within 1 hour or within 30 minutes after the conversion reaches 90%, it being understood that during the interim the conversion may reach 100% or some other maximum. Nonetheless, it is preferred to perform a cooling step d), and especially preferred to complete such cooling step within 20 minutes, within 10 minutes or within 5 minutes after the vinyl conversion reaches 90%.

As before, in the cooling step d), if performed, the temperature may be reduced to no greater than 50° C., preferably no greater than 40° C. In some embodiments, these lower temperatures may be achieved within 30, 20, 10 or 5 minutes after the vinyl conversion reaches 90%. In some embodiments, the temperature of the reaction mixture may be reduced to the range of 40 to 64° C. in step d), and then held in that temperature range to allow further conversion of the vinyl-functional alcohol to product.

As before, following step c) (or step d) if it is performed), the resulting product mixture can be purified as desirable or necessary by, for example, removing residual catalyst, removing high molecular weight impurities, removing unreacted starting materials, removing other reaction by-products, removing any solvent, and the like. It is common to leave the high molecular weight impurities in the product, as separation is difficult on an industrial scale and the smaller amounts thereof that are produced in this process are often tolerated well when the product is processed into downstream products, including moisture curable materials as described below.

Utility of the Product

The product silyl-terminated alcohols, particularly the silyl-terminated polyether alcohols, are useful precursor materials for making crosslinkable silane-terminated polymers that, in turn, are useful in sealant, adhesive and coating applications. The silyl-terminated alcohol can be, for example, coupled with a coupling agent that has two or more groups that react with a hydroxyl group and form a bond to the hydroxyl oxygen atom. Examples of such coupling agents include, for example, polyisocyanates, polycarboxylic acids, carboxylic acid anhydrides, poly(carboxylic acid halides), polyepoxides and the like.

The silyl-terminated alcohol also can be formed into a crosslinkable silane-terminated polymer by first capping the hydroxyl group with a coupling agent as just described, to form an intermediate compound having a silane group and a free hydroxyl-reactive group such as an isocyanate group, and carboxyl group, or an epoxy group. The intermediate compound can then be coupled by reaction with another material having two or more groups that reactive with the free hydroxyl-reactive group. This other material may be, for example, a polyol, a polyamine and the like and in some cases is a polyether polyol or amine-terminated polyether. Crosslinkable silane-terminated polymers of this type are described, for example, in WO 2012/003216 and WO 2013/003061.

The silyl-terminated alcohol and crosslinkable silane-terminated polymers made therefrom form crosslinks by reaction with water, and thus sealants, adhesives and caulks that contain those materials are moisture-curable materials as well.

The following examples are provided to illustrate the invention, but are not intended to limit the scope thereof. All parts and percentages are by weight unless otherwise indicated.

EXAMPLE 1 AND COMPARATIVE SAMPLE A

The vinyl-terminated polyether alcohol used in this and subsequent examples is a polypropylene glycol monoallyl ether having a number average molecular weight of about 800. It contains an average of one allyl group and one hydroxyl group per molecule. A sample of this vinyl-terminated polyether alcohol is dried to a water content of 740 parts per million.

The dried material is charged into a reactor and heated under nitrogen to 75° C. Without further addition of water, a mixture of methyldimethoxysilane and Karstedt's catalyst is added to the heated polyether alcohol, to provide a molar ratio of 0.878 moles of silane per mole of polyether alcohol and a platinum concentration of 200 ppm based on the starting vinyl-terminated polyether alcohol. The temperature of the reaction mixture rises to 95° C. After 8-10 minutes at that temperature (18-20 minutes after addition of silyl hydride and catalyst), the vinyl conversion reaches at least 90%, and reaction mixture is cooled to 65° C. by immersing the reactor in a cooling bath using chilled water as the cooling fluid. The temperature is reduced to 65° C. after about 10 minutes in the cooling bath and then further to 60° C. A sample is then taken and analyzed. Allyl conversion is 94%. By GPC, the heavies content is less than 5% by weight.

Comparative Sample A is made in the same general manner as Example 1, and using the same starting materials except the polypropylene glycol monoallyl ether is dried to 86 parts per million water. This material contains 14% by weight heavies.

EXAMPLE 2 AND COMPARATIVE SAMPLE B

Duplicate samples of the vinyl-terminated polyether alcohol described in Example 1 are dried to 200 and 400 parts per million water, respectively.

Each of the dried samples is separately charged into a reactor and heated under nitrogen to 40° C. Without further addition of water, a mixture of methyldimethoxysilane and Karstedt's catalyst is added to the heated polyether alcohols, to provide a molar ratio of 0.878 moles of silane per mole of polyether alcohol and a platinum concentration of 50 ppm based on the starting vinyl-terminated polyether alcohol.

The temperature of each of the reaction mixtures rise and are controlled to 75° C. After approximately 90% conversion of the allyl groups (less than 10 minutes after the addition of catalyst and methyldimethoxysilane), the reaction mixture in each case is cooled to below 60° C. by immersing the reaction vessel in a chilled bath. Cooling to below 65° C. is achieved in 15-20 minutes after the addition of the silane and catalyst. In each case, the sample is then taken and analyzed. Allyl conversion is approximately 95% in each case. By GPC, the heavies content is less than 5% by weight. These examples collectively form Example 2.

To make Comparative Sample B, different samples of the vinyl-terminated polyether alcohol are dried to 110, 200, 300 and 600 ppm water, respectively. Each is separately reacted with methyldimethoxysilane in the same manner as Example 2, except the temperature of the reaction mixture is controlled to 60° C. in each case by applied cooling during the reaction. The conversion of the sample with 110 ppm water approximates 100%; however, the product contains 15-25% heavies. The conversions of the samples containing 200, 300 and 600 ppm water are only about 94%, 89% and 67%, respectively, and in each case the product contains large amounts of heavies.

Taken together, Example 2 and Comparative Sample B show the effect of water content and reaction temperature. At the lower reaction temperature of Comparative Sample B, the conversion is highly inversely dependent on water content, with inadequate conversions being obtained at above 200 ppm water. In addition, heavies contents are high. Example 2 shows that water contents above 200 ppm are easily tolerated when the higher reaction temperature is used, and that these results are achieved without forming large amount of heavies.

What is claimed is:

1. A process for producing a silyl-terminated alcohol by reacting a vinyl-functional alcohol with a hydrolysable silyl hydride in the presence of a platinum catalyst, comprising the steps of:
   a) heating the vinyl-functional alcohol to a temperature of 40 to 65° C. in the presence of 150 to 2000 ppm water based on the weight of the vinyl-functional alcohol, then
   b) adding the platinum catalyst and from 0.8 to 1.1 moles of the hydrolysable silyl hydride per mole of vinyl-functional alcohol to the heated vinyl-functional alcohol to form a reaction mixture; then
   c) reacting the reaction mixture under conditions such that at least part of the vinyl-functional alcohol and at least part of the hydrolysable silyl hydride react to form the silyl-terminated alcohol, wherein the temperature of the reaction mixture increases at least partially due to exothermic heat of reaction to above 75° C. but not greater than 100° C., and then
   d) upon conversion of 90 to 99% of the vinyl groups of the vinyl-functional alcohol, cooling the reaction mixture to a temperature of 65° C. or below, whereby after step d) the conversion of vinyl-functional alcohol is at least 90% and the amount of high molecular weight impurities is no greater than 10% of the combined weight of the starting amounts of vinyl-functional alcohol and hydrolysable silyl hydride.

2. The process of claim 1 wherein step d) is completed within 30 minutes after the conversion of 90% of the vinyl groups of the vinyl-functional alcohol in step c).

3. The process of claim 2 wherein step d) is completed within 20 minutes after the conversion of the vinyl-functional alcohol reaches 90% in step c).

4. The process of claim 3 wherein step d) is completed within 20 minutes after the conversion of the vinyl-functional alcohol reaches 90% in step c).

5. The process of claim 1 wherein in step d) the reaction mixture is cooled to 40 to 64° C. and held at that temperature to convert more of the vinyl groups of the vinyl-functional alcohol.

6. The process of claim 5 wherein step d) is begun when the conversion of the vinyl-functional alcohol is 92 to 95%.

7. The process of claim 6 wherein amount of high molecular weight impurities is no greater than 6% of the combined weight of the starting amounts of vinyl-functional alcohol and hydrolysable silyl hydride.

8. The process of claim 1, wherein the vinyl group(s) of the vinyl-functional alcohol are allyl group(s).

9. The process of claim 1, wherein the vinyl-functional alcohol is a vinyl-functional polyether alcohol.

10. The process of claim 9, wherein the vinyl-functional polyether alcohol has a number average molecular weight of 500 to 10,000.

11. The process claim 10, wherein the vinyl-functional polyether alcohol has a number average molecular weight of 750 to 1500.

12. The process of claim 11, wherein the vinyl-functional polyether alcohol is a polymer of 1,2-propylene oxide, a polymer of ethylene oxide, or a random or block copolymer of 70-99.5 weight-% 1,2-propylene oxide and correspondingly 0.5 to 30 weight-% ethylene oxide.

13. The process of claim 1 wherein the hydrolysable silyl hydride is one or more of methyldimethoxysilane, trimethoxysilane, methyldiethoxysilane, triethoxysilane, trichlorosilane and methyldichlorosilane.

14. The process of claim 1 wherein in step c) the temperature of the reaction mixture increases at least partially due to exothermic heat of reaction to above 75° C. but not greater than 100° C. within 5 minutes from the start of step b).

15. The process of claim 14 wherein in step c) the temperature increases to not greater than 95° C.

16. A process for producing a silyl-terminated alcohol by reacting a vinyl-functional alcohol with a hydrolysable silyl hydride in the presence of a platinum catalyst, comprising the steps of:
   a) forming a heated mixture of a vinyl-functional alcohol and 150 to 2000 ppm water based on the weight of the vinyl-functional alcohol, which heated mixture has a temperature of 40 to 80° C., then
   b) adding the platinum catalyst and from 0.8 to 1.1 mole of the hydrolysable silyl hydride per mole of vinyl-functional alcohol to the heated mixture to form a reaction mixture; and then
   c) reacting the reaction mixture under conditions including a temperature of 70 to 100° C. such that at least part of the vinyl-functional alcohol and at least part of the hydrolysable silyl hydride react to form the silyl-terminated alcohol, wherein the conversion of vinyl-functional alcohol is at least 90% and the amount of high molecular weight impurities is no greater than 10% of the combined weight of the starting amounts of vinyl-functional alcohol and hydrolysable silyl hydride.

17. The process of claim 16, further comprising:
   d) upon conversion of 90 to 99% of the vinyl groups of the vinyl-functional alcohol during step c), cooling the reaction mixture to a temperature of 65° C. or lower.

18. The process of claim 17 wherein step d) is completed within 30 minutes of the conversion of 90% of the vinyl groups of the vinyl-functional alcohol in step c).

19. The process of claim 18 wherein the amount of water in step a) is 200 to 1000 parts by weight per million based on the weight of the vinyl-functional alcohol.

20. The process of claim 19 wherein the amount of water in step a) is 300 to 600 parts by weight per million based on the weight of the vinyl-functional alcohol.

\* \* \* \* \*